US012119625B2

(12) United States Patent
Travis, Jr. et al.

(10) Patent No.: US 12,119,625 B2
(45) Date of Patent: Oct. 15, 2024

(54) EXPANDER KIT FOR INSTALLING SMALL FRAME CIRCUIT BREAKERS IN ELECTRICAL DISTRIBUTION DEVICES DESIGNED FOR LARGE FRAME CIRCUIT BREAKERS

(71) Applicant: Schneider Electric USA, Inc., Andover, MA (US)

(72) Inventors: Charles Wesley Travis, Jr., Murfreesboro, TN (US); Karthik Sundaramoorthy, Murfreesboro, TN (US); James Raymond Ramsey, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 196 days.

(21) Appl. No.: 17/843,739

(22) Filed: Jun. 17, 2022

(65) Prior Publication Data

US 2023/0411936 A1    Dec. 21, 2023

(51) Int. Cl.
*H02B 1/32* (2006.01)
*H01H 33/666* (2006.01)
*H02B 3/00* (2006.01)

(52) U.S. Cl.
CPC ............ *H02B 1/32* (2013.01); *H01H 33/666* (2013.01); *H02B 3/00* (2013.01)

(58) Field of Classification Search
CPC .... H01H 71/0228; H01H 33/666; H02B 1/32; H02B 3/00
See application file for complete search history.

(56) References Cited

U.S. PATENT DOCUMENTS

| 4,752,233 | A  | * | 6/1988  | Morby ................... | H01R 25/14 361/636 |
| 7,544,907 | B1 | * | 6/2009  | Moffat .................. | H02B 11/02 361/624 |
| 8,137,120 | B2 | * | 3/2012  | Bortoli .................. | H02B 11/04 439/115 |
| 8,339,773 | B2 | * | 12/2012 | Frassineti ............... | H01H 1/58 361/677 |

(Continued)

FOREIGN PATENT DOCUMENTS

| CZ | 15420 U1     | * | 5/2005 |           |
| DE | 19628793 A1  | * | 1/1998 | ............... H02B 1/21 |

(Continued)

OTHER PUBLICATIONS

English Machine Translation of SVINARFLK, Czech Republic CZ 15420 U1, dated May 16, 2005, translatd in 2024 (Year: 2024).*

(Continued)

*Primary Examiner* — Robert J Hoffberg
(74) *Attorney, Agent, or Firm* — Locke Lord LLP

(57) ABSTRACT

The present invention provides a method for installing circuit breakers of different frame sizes into an electrical distribution device at the at the factory or on the jobsite without having to remove the original factory installed line and load busing and installing new line and load busing for the particular frame size of the circuit breaker to be installed. The invention also provides a means for reducing the number of line and load busing assemblies that the electrical distribution device manufacturer must keep in inventory.

13 Claims, 4 Drawing Sheets

(56) References Cited

U.S. PATENT DOCUMENTS

| | | |
|---|---|---|
| 9,263,860 B2 * | 2/2016 | Crooks .................... H02B 1/04 |
| 2006/0118320 A1 | 6/2006 | Josten et al. |
| 2006/0120026 A1 | 6/2006 | Wiant et al. |
| 2015/0200525 A1 | 7/2015 | Crooks et al. |
| 2018/0083426 A1 | 3/2018 | Ali et al. |

FOREIGN PATENT DOCUMENTS

| | | | | |
|---|---|---|---|---|
| GB | 2541363 A | * | 2/2017 | ............. H02B 1/052 |
| JP | 2014107926 A | * | 6/2014 | |
| WO | 2016171706 A1 | | 10/2016 | |

OTHER PUBLICATIONS

International Search Report and Written Opinion dated Sep. 11, 2023 for corresponding International Application No. PCT/US23/25315, 17 pages.

* cited by examiner

EXPANDER KIT FOR INSTALLING SMALL FRAME CIRCUIT BREAKERS IN ELECTRICAL DISTRIBUTION DEVICES DESIGNED FOR LARGE FRAME CIRCUIT BREAKERS

TECHNICAL FIELD

The present disclosure relates to electrical distribution devices having a main breaker, and particularly, to an expander kit that permits smaller frame circuit breakers to be installed in electrical distribution devices designed for large frame circuit breakers.

BACKGROUND

Typically, the line and load busing for an electrical distribution device is designed for the frame size of the circuit breaker to be installed in the electrical distribution device. Therefore, a small frame circuit breaker can not be installed in an electrical distribution device designed for a large frame circuit breaker, and vice versa. This means that the manufacturer must maintain line and load busing parts for at least two circuit breaker frame sizes. Also, if an electrical distribution device designed for one of a large or a small frame circuit breaker is at the job site, and a circuit breaker of another frame size is required, the existing line and load bussing must be removed and replaced with line and load busing designed for the required circuit breaker frame size. This can significantly increase the installation time and the cost of the electrical distribution device.

SUMMARY OF THE INVENTION

The present invention solves these problems by assembling each electrical distribution device having a main circuit breaker with line and load busing designed for a large frame circuit breaker and, when required, providing an expander kit for smaller frame circuit breakers. The expander kit can be factory assembled on an ordered small frame circuit breaker or easily installed on a small frame circuit breaker already at the jobsite and it does not require the removal of the factory installed large frame breaker line and load busing. The expander kit is more economical to the manufacturer because he does not need to maintain an inventory of busing assemblies for small frame circuit breakers and the electrical contractor can quickly and economically change from a large frame circuit breaker to a smaller frame circuit breaker at the jobsite.

An expander kit for electrically connecting a small frame circuit breaker to a large frame circuit breaker line and load bus assemblies comprising:
 a small frame circuit breaker adapter for attaching the small frame circuit breaker to a large frame circuit breaker mounting bracket;
 an A phase line bus expander for electrically connecting an A phase line bus of a large frame line bus assembly to an A phase line terminal of the small frame circuit breaker;
 a B phase line bus connector for electrically connecting a B phase line bus of the large frame line bus assembly to a B phase line terminal of the small frame circuit breaker;
 a C phase line bus expander for electrically connecting a C phase line bus of the large frame line bus assembly to a C phase line terminal of the small frame circuit breaker;
 an A phase load bus expander for electrically connecting an A phase load bus of a large frame load bus assembly to an A phase load terminal or the small frame circuit breaker;
 a B phase load bus connector for electrically connecting a B phase load bus of the large frame load bus assembly to a B phase lode terminal of the small frame circuit breaker; and
 a C phase load bus expander for electrically connecting a C phase load bus of the large frame load bus assembly to a C phase load terminal of the small frame circuit breaker.

Figure 1:
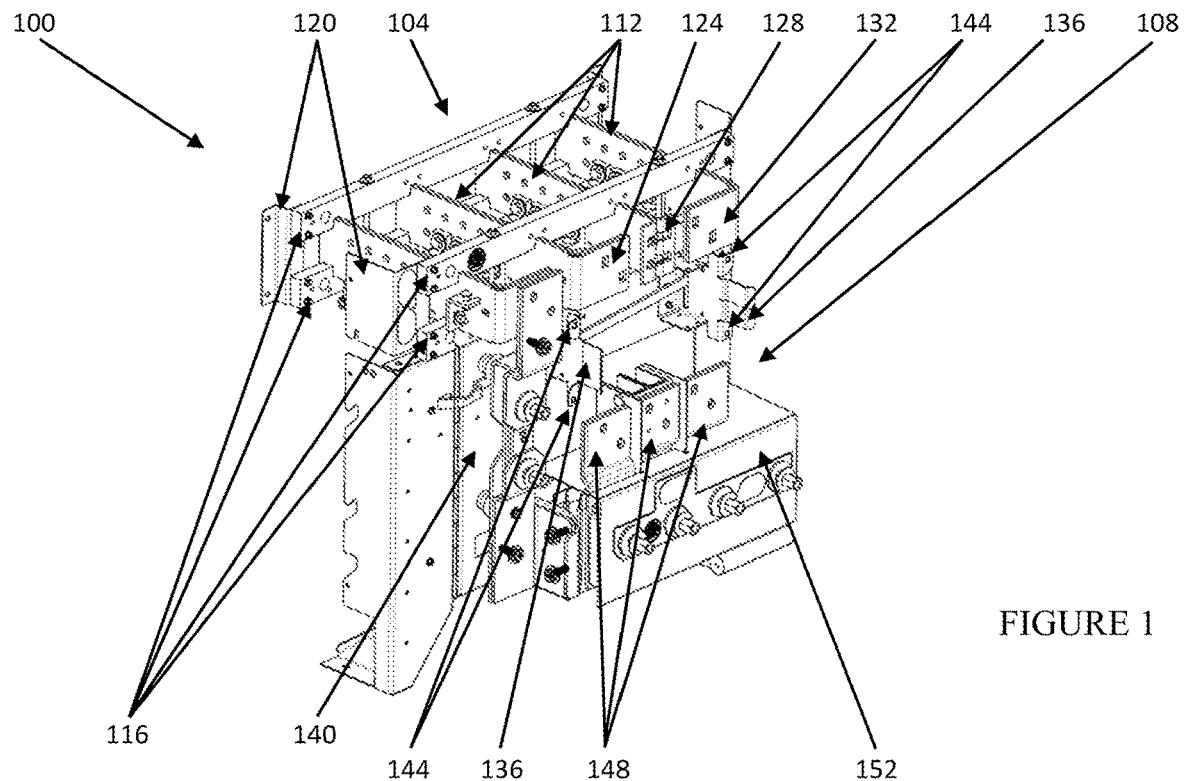
FIG. 1 illustrates a front view of an electrical distribution device with line and load bussing designed for a large frame circuit breaker.

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

FIG. 1 illustrates an electrical distribution device 100 with a large frame circuit breaker line bus assembly 104 and large frame circuit breaker load bus 108 installed. The large frame circuit breaker line bus assembly 104 includes large frame line bus conductors 112 that are supported by line bus conductor supports 116. The line bus conductor supports 116 are attached to structural components of the electrical distribution device 100 by line bus conductor support attachment brackets 120. The A phase line conductor 112 has an A phase circuit breaker contact area 124, the B phase line conductor 112 has a B phase circuit breaker contact area 128 and the C phase line conductor 112 has a C phase circuit breaker contact area 132. The line bus conductors 112 and their respective circuit breaker contact areas, 124, 128 and 132 each have a cross-sectional area sufficient to conduct a large frame circuit breaker's current interrupting rating and are sized to coincide with the line input of a large frame circuit breaker (not shown). A large frame circuit breaker mounting bracket 136 is attached to a structural component 140 of the electrical distribution device 100. The large frame circuit breaker mounting bracket 136 has mounting points 144 for securing a large frame circuit breaker. The large frame circuit breaker load bus 108 includes A, B and C phase conductors 148 which are similar to the line bus conductors 112 in construction. The A, B and C phase conductors 148 are electrically connected to a through bus unit 152, which is electrically connected to an adjacent electrical distribution device 100 (not shown).

Figure 2:
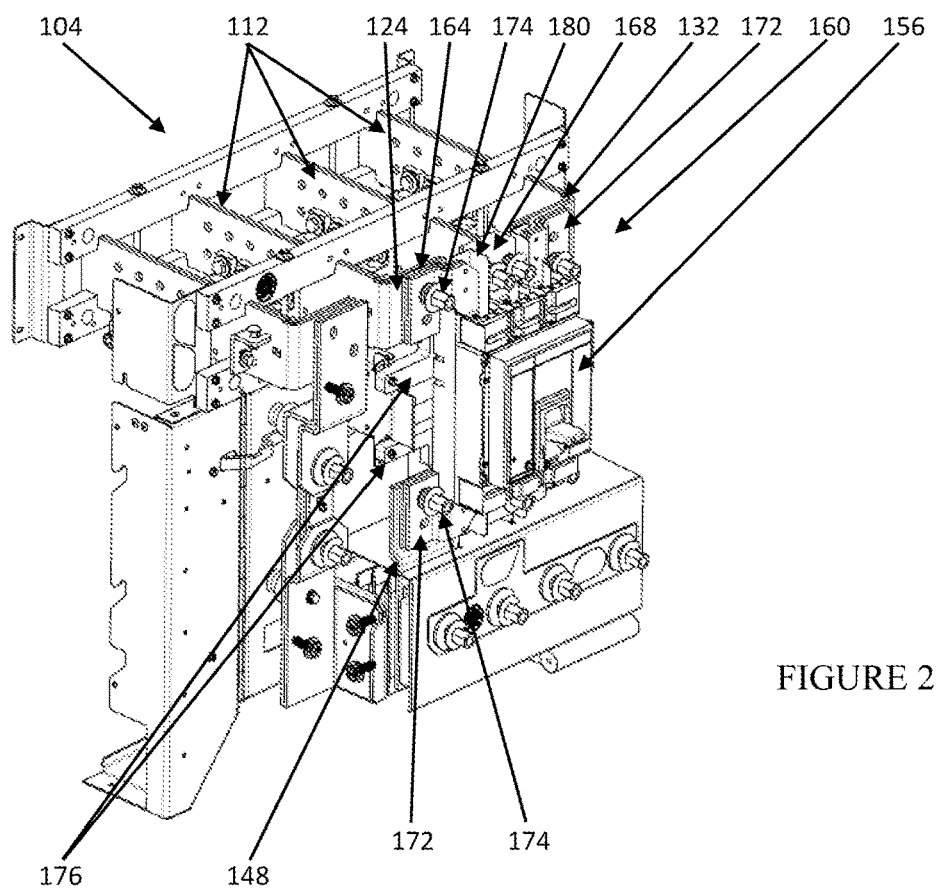
FIG. 2 illustrates the electrical distribution device of FIG. 1 with line and load bussing designed for a large frame circuit breaker with a smaller frame circuit breaker installed according to the present invention.
Figure 5:
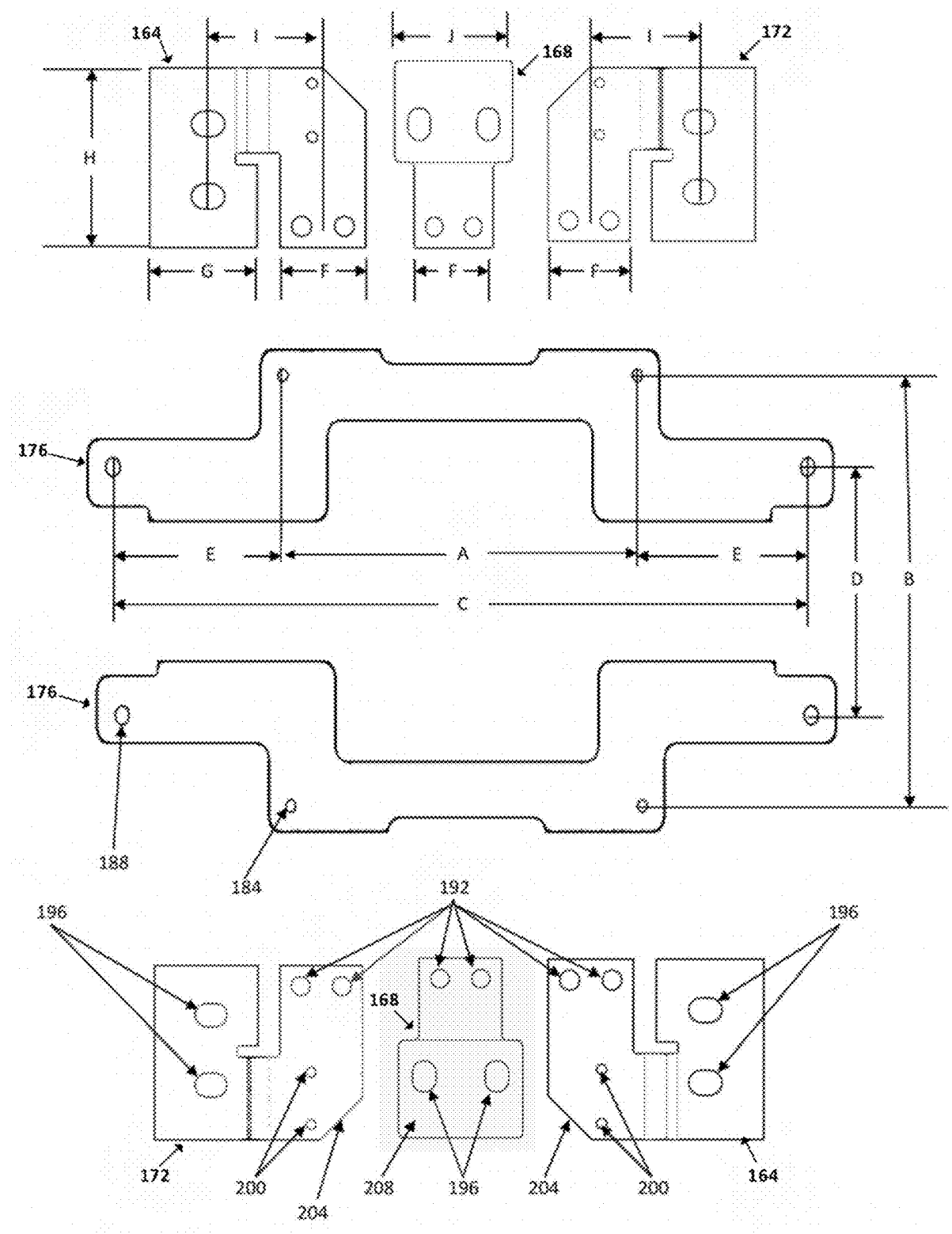
FIG. 5 illustrates the components of an expander kit.

FIG. 2 illustrates the electrical distribution device 100 of FIG. 1 with a small frame circuit breaker 156 installed on the large frame circuit breaker mounting bracket 136 and electrically connected to the large frame circuit breaker line bus assembly 104 and load bus assembly 108 using an expander kit 160, which is shown in more detail in FIG. 5. The expander kit 160 includes two NC phase expander buses 164, two B phase connectors 168 and two C/A phase expander buses 172, which make the electrical connections between the small frame circuit breaker 156 and the large frame line bus conductors 112 and large frame load bus conductors 148. The electrical connection is secured by bolts 174, which are torqued to approximately 70 foot/pounds. The line bus A phase expander bus 164 and the load bus C phase expander bus 172 are identical, as are the line bus C phase expander bus 172 and the load bus A phase expander bus 164. The A/C phase expander buses 164 and C/A phase expander buses 172 may be a single electrical conductor or a lamination of several electrical conductors depending on the cross-sectional area being sufficient to conduct a current equal to a large frame circuit breaker's current interrupting rating. The small frame circuit breaker 156 is attached to a small frame circuit breaker adapter 176, which can be made from a single piece of electrical insulating material or two small frame circuit breaker adapters 176 (as shown in the figures), using the standard small frame circuit breaker attachment means. The small frame circuit breaker adapters 176 are attached to the large frame circuit breaker mounting bracket 136 at the large frame circuit breaker mounting points 144 shown in FIG. 1

FIGS. 3-6 illustrate in more detail, the elements of the expander kit 160 which includes the small frame circuit breaker adapters 176, a first bus expander configuration 164, a second bus expander configuration 168 and a third bus expander configuration 172. The third bus expander 172 is basically a mirror image of the first bus expander 164. The second bus expander configuration 168 is used only on electrical connections between the small frame circuit breaker 156 and the large frame circuit breaker line bus assembly 104 and load bus assembly 108.

Figure 3:
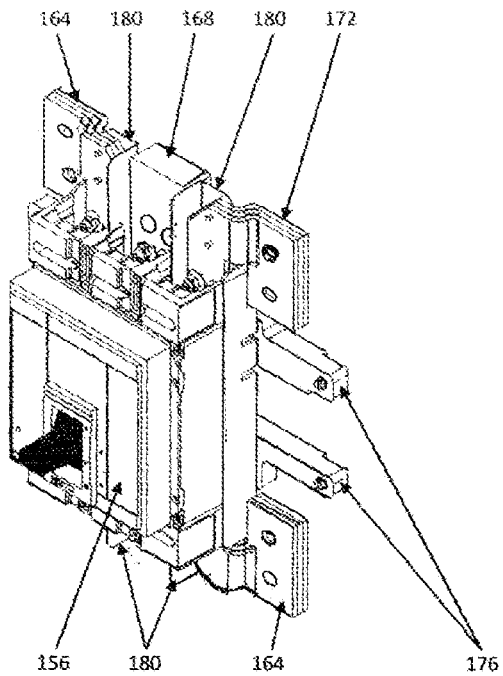
FIG. 3 illustrates a front view of a typical small frame circuit breaker with an expander kit installed.

Referring now to FIG. 3, a front view the small frame circuit breaker 156 with an installed expander kit 160 is shown. The small frame circuit breaker adapters 176 are attached to the back of the circuit breaker 156. The A phase and C phase line extenders, 164 and 172 respectively, and B phase line connector 168 are attached to the line side of the circuit breaker 156 and the A phase and C phase load extenders, 172 and 164 respectively, and B phase load connector 168 are attached to the load side of the circuit breaker 156. An L-shaped insulator 180 is attached to the A and C phase extenders, 164 and 172 respectively, on both the line and load sides of the circuit breaker 156. The L-shaped insulators 180 provide additional through air clearance between electrical phases to prevent a possible electrical arc between phases.

Figure 4:
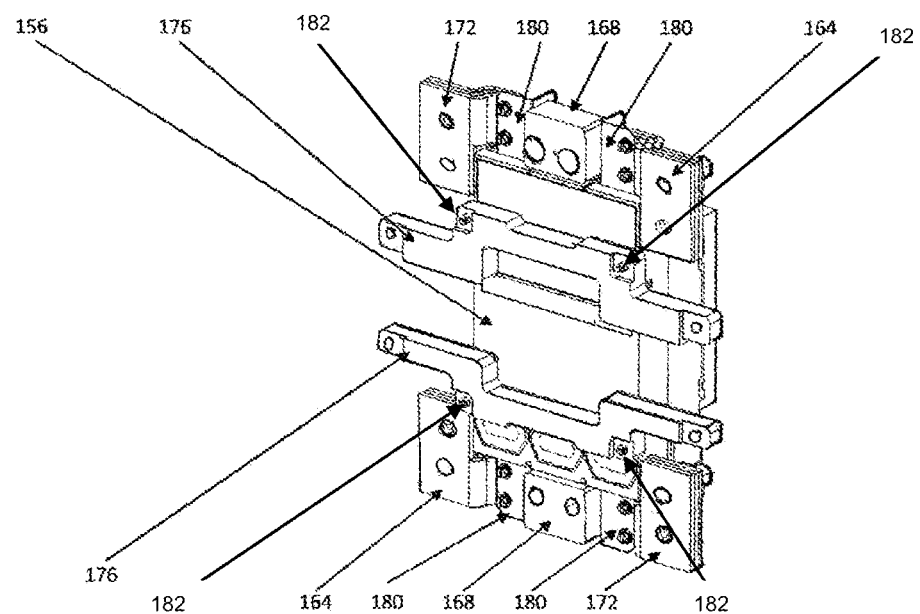
FIG. 4 illustrates a rear view of a typical small frame circuit with an expander kit installed.

Referring now to FIG. 4, a rear view the circuit breaker 156 with an installed expander kit 160 is shown. In this view the orientation of the installed components of the expander kit 160, including the small frame circuit breaker mounting points 182, are clearly shown.

In FIG. 5, further characteristic of the expander kit 160 components are defined. The small frame circuit breaker adapters 176 include holes 184 for attaching to the small frame circuit breaker 156 and holes 188 for attaching to the large frame circuit breaker mounting bracket 136. The A/C phase expander buses 164, B phase connectors 168 and C/A phase expander buses 172 include holes 192 for connecting to the line and load terminals (not shown) of the small frame circuit breaker 156 and holes 196 for connecting to the line bus conductor 112 contact areas 124, 128 and 132. Holes 200 are provided for attaching the L-shaped insulators 180 to the A and C phase expander buses, 164 and 172 respectively. A top inside corner 204 of each A and C phase expander bus, 164 and 172 respectively, adjacent to the B phase connector 168, is removed to increase the through air electrical clearance between electrical phases and reduce the possibility of an electrical arc between the A or C phase expander bus, 164 and 172 respectively, and the B phase connector 168. Reference letter A is equivalent to the horizontal spacing between the small frame circuit breakers mounting points and reference letter B is equivalent to the vertical spacing between the small frame circuit breakers mounting points. Reference letter C is equivalent to the horizontal spacing between the large frame circuit breakers mounting points and reference letter D is equivalent to the vertical spacing between the large frame circuit breakers mounting points. Reference letter E is the horizontal distance between the large frame circuit breaker and small frame circuit breaker mounting points, 144 and 182 respectively. Reference letter F is equivalent to, but not greater than, the width of the small frame circuit breakers line and load side electrical terminals (not shown). Reference letter G is equivalent to, but not greater than, the width of the large frame circuit breaker's A and C phase contact areas, 124 and 132 respectively, and reference letter H is equivalent to, but not greater than, the height of the large frame circuit breaker's line bus A and C phase electrical contact areas, 124 and 132 respectively. Reference letter is the distance between the distance between the center line of horizontal dimension F and the center line of dimension G. Reference letter I J is equivalent to, but not greater than, the width of the large frame circuit breaker's B phase electrical contact area 128.

Figure 6:
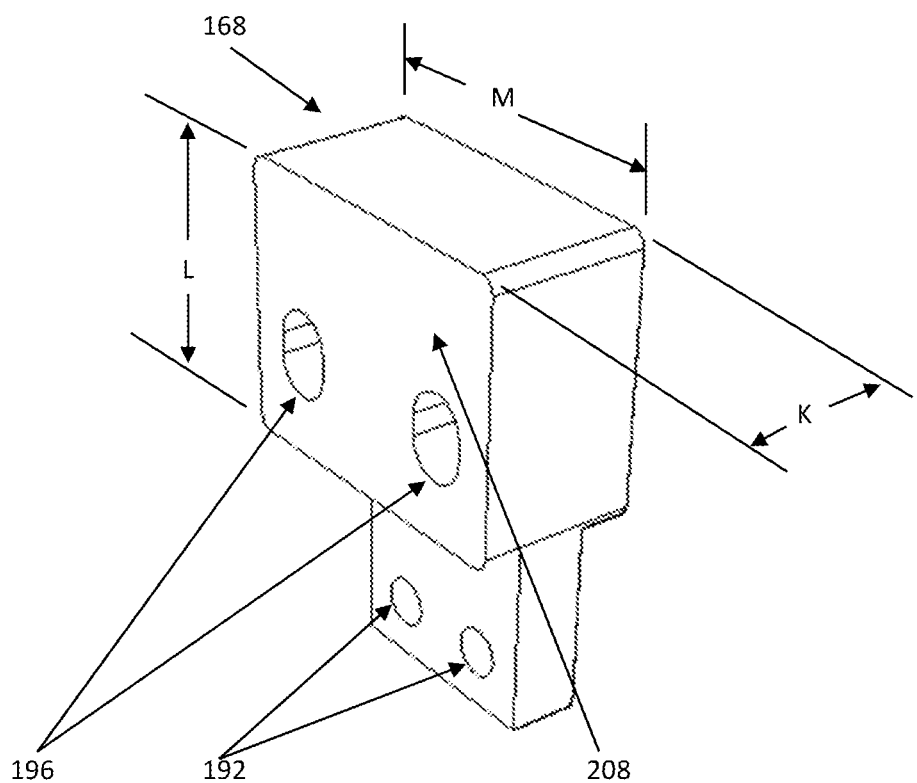
FIG. 6 is an oblique view of the B phase connector.

Referring to FIG. 6, the B phase connector 168 is shown in an oblique view. The dimension defined by reference letter K is determined by the offset dimension of the A and C phase expander bus, 164 and 172 respectively. The offset dimension-K is determined by whether a single electrical conductor or a lamination of several electrical conductors is required to obtain the cross-sectional area sufficient to conduct a current equal to a large frame circuit breaker's current interrupting rating. The dimension defined by reference letter L is determined by the height of the A and C phase expander bus, 164 and 172 respectively, and a surface of the small frame circuit breaker 156 adjacent the circuit breaker terminals (not shown). Reference letter M is equivalent to, but not greater than, the width of the large frame circuit breaker's B phase contact areas, 128. The electrical contact area 208 of the B phase connector 168 is defined by reference letter L and M.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure.

Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. An expander kit for electrically connecting a small frame circuit breaker to large frame circuit breaker line and load bus assemblies, the expander kit comprising:
   a small frame circuit breaker adapter configured to attach the small frame circuit breaker to a large frame circuit breaker mounting bracket, wherein the small frame circuit breaker adapter and the large frame circuit breaker mounting bracket each include mounting points, wherein each of the mounting points of the small frame circuit breaker adapter are configured to face a corresponding one of the mounting points of the large frame circuit breaker mounting bracket, and wherein the mounting points of the small frame circuit breaker adapter are on a substantially same plane;
   an A phase line bus expander configured to electrically connect an A phase line bus of the large frame line bus assembly to an A phase line terminal of the small frame circuit breaker, wherein the A phase line bus expander is further configured to extend outwards from the A phase line terminal to the A phase line bus;
   a B phase line bus connector configured to electrically connect a B phase line bus of the large frame line bus assembly to a B phase line terminal of the small frame circuit breaker, wherein the B phase line bus connector is further configured to extend outwards from the B phase line terminal to the B phase line bus;
   a C phase line bus expander configured to electrically connect a C phase line bus of the large frame line bus assembly to a C phase line terminal of the small frame circuit breaker, wherein the C phase line bus expander is further configured to extend outwards from the C phase line terminal to the C phase line bus;
   an A phase load bus expander configured to electrically connect an A phase load bus of the large frame load bus assembly to an A phase load terminal of the small frame circuit breaker, wherein the A phase load bus expander is further configured to extend outwards from the A phase load terminal to the A phase load bus;
   a B phase load bus connector configured to electrically connect a B phase load bus of the large frame load bus assembly to a B phase load terminal of the small frame circuit breaker, wherein the B phase load bus connector is further configured to extend outwards from the B phase load terminal to the B phase load bus; and
   a C phase load bus expander configured to electrically connect a C phase load bus of the large frame load bus assembly to a C phase load terminal of the small frame circuit breaker, wherein the C phase load bus expander is further configured to extend outwards from the C phase load terminal to the C phase load bus,
   wherein when the A phase line and load bus expanders, the B phase line and load bus connectors and the C phase line and load bus expanders are connected to the small frame circuit breaker and the small frame circuit breaker is installed on the small frame circuit breaker adapter, a surface of each of the A phase line bus expander, the B phase line bus connector and the C phase line bus expander that is distal to the small frame circuit breaker are on a substantially same plane, each of said surfaces of the A phase line bus expander, the B phase line bus connector and the C phase line bus expander being configured to electrically couple to a respective one of the A, B, and C phase line buses, and a surface of each of the A phase load bus expander, the B phase load bus connector and the C phase load bus expander that is distal to the small frame circuit breaker are on a substantially same plane, each of said surfaces of the A phase load bus expander, the B phase load bus connector and the C phase load bus expander being configured to electrically couple to a respective one of the A, B, and C phase load buses.

2. The expander kit of claim 1, wherein the A phase line bus expander and a C phase load bus expander are identical in construction and the C phase line bus expander and A phase load expander are identical in construction.

3. The expander kit of claim 1, wherein a first L-shaped insulator is attached to the A phase line bus expander, a second L-shaped insulator is attached to the C phase line bus expander, a third L-shaped insulator is attached to the A phase load bus expander, and a fourth L-shaped insulator is attached to the C phase load bus expander.

4. The expander kit of claim 3, wherein the first L-shaped insulator ensures a proper through air clearance between the A phase line bus expander and the B phase line bus connector, the second L-shaped insulator ensures a proper through air clearance between the C phase line bus expander and the B phase line bus connector, the third L-shaped insulator ensures a proper through air clearance between the A phase load bus expander and the B phase load bus connector, and the fourth L-shaped insulator ensures a proper through air clearance between the C phase load bus expander and the B phase load bus connector.

5. The expander kit of claim 1, wherein the expander kit can be factory installed on the small frame circuit breaker or installed at a jobsite.

6. The expander kit of claim 1, wherein each of the A and C phase line and load bus expanders and each of the B phase line and load bus connectors can be a single conductor or a lamination of several conductors.

7. The expander kit of claim 1, wherein each of the A and C phase line and load bus expanders and each of the B phase line and load bus connectors have a cross sectional area sufficient to carry the rated interrupting current of a large frame circuit breaker.

8. An expander kit for installing a small frame circuit breaker into an electrical distribution device configured for a large frame circuit breaker, the expander kit comprising:
   an adapter configured to attach the small frame circuit breaker onto a large frame circuit breaker mounting bracket, wherein the adapter and the large frame circuit breaker mounting bracket each include mounting points, wherein each of the mounting points of the adapter are configured to face a corresponding one of the mounting points of the large frame circuit breaker mounting bracket, and wherein the mounting points of the adapter are on a substantially same plane;
a first bus expander configuration;
a second bus expander configuration; and
a third bus expander configuration;
wherein the first bus expander configuration is configured to electrically connect an A phase line bus of a large frame line bus assembly to an A phase line terminal of the small frame circuit breaker and to electrically connect a C phase load bus of a large frame load bus assembly to a C phase load terminal of the small frame circuit breaker, wherein the first bus expander configuration is further configured to extend outwards from the A phase line terminal to the A phase line bus and to extend outwards from the C phase load terminal to the C phase load bus;
the second bus expander configuration is configured to electrically connect a B phase line bus of the large frame line bus assembly to a B phase line terminal of the small frame circuit breaker and to electrically connect a B phase load bus of the large frame load bus assembly to a B phase load terminal of the small frame circuit breaker, wherein the second bus expander configuration is further configured to extend outwards from the B phase line terminal to the B phase line bus and to extend outwards from the B phase load terminal to the B phase load bus; and
the third bus expander configuration is configured to electrically connect a C phase line bus of the large frame line bus assembly to a C phase line terminal of the small frame circuit breaker and to electrically connect an A phase load bus of the large frame load bus assembly to an A phase load terminal of the small frame circuit breaker, wherein the third bus expander configuration is further configured to extend outwards from the C phase line terminal to the C phase line bus and to extend outwards from the A phase load terminal to the A phase load bus,
wherein when the first, second and third bus expander configurations are connected to the small frame circuit breaker and the small frame circuit breaker is installed on the adapter, a first surface of each of the first, second and third bus expander configurations that is distal to the small frame circuit breaker are on a substantially same plane, each of said first surfaces of the first, second and third bus expander configurations being configured to electrically couple to a respective one of the A, B, and C phase line buses, and a second surface of each of the first, second and third bus expander configurations that is distal to the small frame circuit breaker are on a substantially same plane, each of said second surfaces of the first, second and third bus expander configurations being configured to electrically couple to a respective one of the A, B, and C phase load buses.

9. The expander kit of claim 8, wherein the third bus expander configuration is a mirror image of the first expander configuration.

10. The expander kit of claim 8, wherein the second bus expander configuration is used only on electrical connections between the small frame circuit breaker and the large frame circuit breaker line and load bus assemblies.

11. An expander kit for making electrical connections between a small frame circuit breaker and a large frame circuit breaker mounting bracket, the expander kit comprising:
a first bus expander configuration;
a second bus expander configuration; and
a third bus expander configuration;
wherein the first bus expander configuration is configured to electrically connect an A phase line bus of a large frame line bus assembly to an A phase line terminal of the small frame circuit breaker and to electrically connect a C phase load bus of a large frame load bus assembly to a C phase load terminal of the small frame circuit breaker, wherein the first bus expander configuration is further configured to extend outwards from the A phase line terminal to the A phase line bus and to extend outwards from the C phase load terminal to the C phase load bus;
the second bus expander configuration is configured to electrically connect a B phase line bus of the large frame line bus assembly to a B phase line terminal of the small frame circuit breaker and to electrically connects a B phase load bus of the large frame load bus assembly to a B phase load terminal of the small frame circuit breaker, wherein the second bus expander configuration is further configured to extend outwards from the B phase line terminal to the B phase line bus and to extend outwards from the B phase load terminal to the B phase load bus; and
the third bus expander configuration is configured to electrically connect a C phase line bus of the large frame line bus assembly to a C phase line terminal of the small frame circuit breaker and to electrically connect an A phase load bus of the large frame load bus assembly to an A phase load terminal of the small frame circuit breaker, wherein the third bus expander configuration is further configured to extend outwards from the C phase line terminal to the C phase line bus and to extend outwards from the A phase load terminal to the A phase load bus,
wherein when the first, second and third bus expander configurations are connected to the small frame circuit breaker and the small frame circuit breaker is installed on the large frame circuit breaker mounting bracket, a first surface of each of the first, second and third bus expander configurations that is distal to the small frame circuit breaker are on a substantially same plane, each of said first surfaces of the first, second and third bus expander configurations being configured to electrically couple to a respective one of the A, B, and C phase line buses, and a second surface of each of the first, second and third bus expander configurations that is distal to the small frame circuit breaker are on a substantially same plane, each of said second surfaces of the first, second and third bus expander configurations being configured to electrically couple to a respective one of the A, B, and C phase load buses.

12. An expander kit for electrically connecting a small frame circuit breaker to large frame circuit breaker line and load bus assemblies, the expander kit comprising:
a small frame circuit breaker adapter configured to attach the small frame circuit breaker to a large frame circuit breaker mounting bracket;
an A phase line bus expander configured to electrically connect an A phase line bus of the large frame line bus assembly to an A phase line terminal of the small frame circuit breaker;
a B phase line bus connector configured to electrically connect a B phase line bus of the large frame line bus assembly to a B phase line terminal of the small frame circuit breaker;

a C phase line bus expander configured to electrically connect a C phase line bus of the large frame line bus assembly to a C phase line terminal of the small frame circuit breaker;

an A phase load bus expander configured to electrically connect an A phase load bus of the large frame load bus assembly to an A phase load terminal of the small frame circuit breaker;

a B phase load bus connector configured to electrically connect a B phase load bus of the large frame load bus assembly to a B phase load terminal of the small frame circuit breaker; and a C phase load bus expander configured to electrically connect a C phase load bus of the large frame load bus assembly to a C phase load terminal of the small frame circuit breaker, wherein a first L-shaped insulator is attached to the A phase line bus expander, a second L-shaped insulator is attached to the C phase line bus expander, a third L-shaped insulator is attached to the A phase load bus expander, and a fourth L-shaped insulator is attached to the C phase load bus expander.

13. The expander kit of claim 12, wherein the first L-shaped insulator ensures a proper through air clearance between the A phase line bus expander and the B phase line bus connector, the second L-shaped insulator ensures a proper through air clearance between the C phase line bus expander and the B phase line bus connector, the third L-shaped insulator ensures a proper through air clearance between the A phase load bus expander and the B phase load bus connector, and the fourth L-shaped insulator ensures a proper through air clearance between the C phase load bus expander and the B phase load bus connector.

* * * * *